United States Patent
Gupta et al.

(10) Patent No.: US 11,425,766 B2
(45) Date of Patent: Aug. 23, 2022

(54) DETERMINING A LINK ASSOCIATION FOR A DEVICE

(71) Applicant: QUALCOMM Incorporated, San Diego, CA (US)

(72) Inventors: Piyush Gupta, Bridgewater, NJ (US); Hua Wang, Basking Ridge, NJ (US); Junyi Li, Chester, NJ (US); Lik Hang Silas Fong, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/948,107

(22) Filed: Sep. 3, 2020

(65) Prior Publication Data

US 2021/0307092 A1    Sep. 30, 2021

Related U.S. Application Data

(60) Provisional application No. 63/000,871, filed on Mar. 27, 2020.

(51) Int. Cl.
*H04W 72/04*    (2009.01)
*H04W 76/14*    (2018.01)
(Continued)

(52) U.S. Cl.
CPC .......... *H04W 76/14* (2018.02); *H04B 17/318* (2015.01); *H04B 17/336* (2015.01);
(Continued)

(58) Field of Classification Search
CPC ..... H04W 76/14; H04W 76/27; H04W 24/10; H04W 72/0493; H04W 80/02;
(Continued)

(56) References Cited

U.S. PATENT DOCUMENTS 10,701,581 B2 *   6/2020  Seo .................... H04L 43/16
2014/0334331 A1 * 11/2014  Wager ................ H04W 16/26
                                                       370/252
(Continued)

OTHER PUBLICATIONS

Ericsson: "UE-NW Relay Selection/Reselection Rules for Out-of-Coverage Remote UE", 3GPP Draft; R1-154441 Relay Selection, 3rd Generation Partnership Project (3GPP), Mobile Competence Centre; 650, Route Des Lucioles; F-06921 Sophia-Antipolis Cedex; France, vol. RAN WG1. No. Beijing, P.R. China; Aug. 24, 2015-Aug. 28, 2015, Aug. 23, 2015 (Aug. 23, 2015), XP051001731, Retrieved from the Internet: URL: http://www.3gpp.org/ftp/Meetings_3GPP_SYNC/RAN1/Docs/ [retrieved on Aug. 23, 2015], Section 1. Introduction, Section 2. The Use of Uu Link Quality, Section 3. The Use of PC5 Link Quality.

(Continued)

*Primary Examiner* — Hassan Kizou
*Assistant Examiner* — Mahbubul Bar Chowdhury
(74) *Attorney, Agent, or Firm* — Harrity & Harrity, LLP

(57)    ABSTRACT

Various aspects of the present disclosure generally relate to wireless communication. In some aspects, a device may measure a set of reference signal receive power (RSRP) metrics for reference signals including one or more reference signals from a base station and one or more reference signals from a controller associated with the device; and determine, based at least in part on the RSRP metrics, a configuration for receiving communications from the controller via a direct communication link with the controller or via the base station. Numerous other aspects are provided.

31 Claims, 10 Drawing Sheets

(51) Int. Cl.
*H04W 24/10* (2009.01)
*H04B 17/336* (2015.01)
*H04W 76/27* (2018.01)
*H04W 80/02* (2009.01)
*H04B 17/318* (2015.01)
*H04W 92/18* (2009.01)

(52) U.S. Cl.
CPC ....... *H04W 24/10* (2013.01); *H04W 72/0493* (2013.01); *H04W 76/27* (2018.02); *H04W 80/02* (2013.01); *H04W 92/18* (2013.01)

(58) Field of Classification Search
CPC ..... H04W 92/18; H04W 76/23; H04W 48/20; H04W 40/12; H04W 40/22; H04B 17/318; H04B 17/336; H04B 17/382; Y02D 30/70
See application file for complete search history.

(56) References Cited

U.S. PATENT DOCUMENTS

| | | | | |
|---|---|---|---|---|
| 2016/0374130 | A1* | 12/2016 | Saiwai | H04W 76/14 |
| 2017/0099689 | A1* | 4/2017 | Kalhan | H04W 48/16 |
| 2017/0127301 | A1 | 5/2017 | Sharma et al. | |
| 2019/0313315 | A1* | 10/2019 | Xu | H04W 36/30 |
| 2020/0267025 | A1* | 8/2020 | Yu | H04W 88/04 |
| 2020/0288535 | A1* | 9/2020 | Sharma | H04W 36/0033 |
| 2020/0374857 | A1* | 11/2020 | Zeng | H04W 56/0015 |
| 2021/0105863 | A1* | 4/2021 | Martin | H04W 72/02 |
| 2021/0112481 | A1* | 4/2021 | Martin | H04W 28/0215 |
| 2021/0368400 | A1* | 11/2021 | Xu | H04W 36/0061 |

OTHER PUBLICATIONS

International Search Report and Written Opinion—PCT/US2021/020298—ISA/EPO—dated Jun. 10, 2021.

* cited by examiner

DETERMINING A LINK ASSOCIATION FOR A DEVICE

CROSS-REFERENCE TO RELATED APPLICATION

This patent application claims priority to Provisional Patent Application No. 63/000,871, filed on Mar. 27, 2020, entitled "DETERMINING A LINK ASSOCIATION FOR A DEVICE," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for link association for a device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a device, may include measuring a set of reference signal receive power (RSRP) metrics for reference signals including one or more reference signals from a base station and one or more reference signals from a controller associated with the device; and determining, based at least in part on the RSRP metrics, a configuration for receiving communications from the controller via a direct communication link with the controller or via the base station.

In some aspects, a method of wireless communication, performed by a controller, may include receiving, from a device, a set of RSRP metrics for reference signals including one or more reference signals associated with a base station and one or more reference signals associated with the controller; and determining, based at least in part on the RSRP metrics, a configuration for the device to receive communications from the controller via a direct communication link with the controller or via the base station.

In some aspects, a method of wireless communication, performed by a base station, may include receiving, from a device, a set of RSRP metrics for reference signals including one or more reference signals associated with the base station and one or more reference signals associated with a controller associated with the device; and determining, based at least in part on the RSRP metrics, a configuration for the device to receive communications from the controller via a direct communication link with the controller or via the base station.

In some aspects, a device for wireless communication may include a memory and one or more processors operatively coupled to the memory. The memory and the one or more processors may be configured to measure a set of RSRP metrics for reference signals including one or more reference signals from a base station and one or more reference signals from a controller associated with the device; and determine, based at least in part on the RSRP metrics, a configuration for receiving communications from the controller via a direct communication link with the controller or via the base station.

In some aspects, a controller for wireless communication may include a memory and one or more processors operatively coupled to the memory. The memory and the one or more processors may be configured to receive, from a device, a set of RSRP metrics for reference signals including one or more reference signals associated with a base station and one or more reference signals associated with the controller; and determine, based at least in part on the RSRP metrics, a configuration for the device to receive communications from the controller via a direct communication link with the controller or via the base station.

In some aspects, a base station for wireless communication may include a memory and one or more processors operatively coupled to the memory. The memory and the one or more processors may be configured to receive, from a device, a set of RSRP metrics for reference signals including one or more reference signals associated with the base station and one or more reference signals associated with a controller associated with the device; and determine, based at least in part on the RSRP metrics, a configuration for the device to receive communications from the controller via a direct communication link with the controller or via the base station.

In some aspects, a non-transitory computer-readable medium may store one or more instructions for wireless communication. The one or more instructions, when executed by one or more processors of a device, may cause the one or more processors to measure a set of RSRP metrics for reference signals including one or more reference signals from a base station and one or more reference signals from a controller associated with the device; and determine, based at least in part on the RSRP metrics, a configuration for receiving communications from the controller via a direct communication link with the controller or via the base station.

In some aspects, a non-transitory computer-readable medium may store one or more instructions for wireless communication. The one or more instructions, when executed by one or more processors of a controller, may cause the one or more processors to receive, from a device, a set of RSRP metrics for reference signals including one or more reference signals associated with a base station and one or more reference signals associated with the controller; and determine, based at least in part on the RSRP metrics, a configuration for the device to receive communications from the controller via a direct communication link with the controller or via the base station.

In some aspects, a non-transitory computer-readable medium may store one or more instructions for wireless communication. The one or more instructions, when executed by one or more processors of a base station, may cause the one or more processors to receive, from a device, a set of RSRP metrics for reference signals including one or more reference signals associated with the base station and one or more reference signals associated with a controller associated with the device; and determine, based at least in part on the RSRP metrics, a configuration for the device to receive communications from the controller via a direct communication link with the controller or via the base station.

In some aspects, an apparatus for wireless communication may include means for measuring a set of RSRP metrics for reference signals including one or more reference signals from a base station and one or more reference signals from a controller associated with the apparatus; and means for determining, based at least in part on the RSRP metrics, a configuration for receiving communications from the controller via a direct communication link with the controller or via the base station.

In some aspects, an apparatus for wireless communication may include means for receiving, from a device, a set of RSRP metrics for reference signals including one or more reference signals associated with a base station and one or more reference signals associated with the apparatus; and means for determining, based at least in part on the RSRP metrics, a configuration for the device to receive communications from the controller via a direct communication link with the controller or via the base station.

In some aspects, an apparatus for wireless communication may include means for receiving, from a device, a set of RSRP metrics for reference signals including one or more reference signals associated with the apparatus and one or more reference signals associated with a controller associated with the device; and means for determining, based at least in part on the RSRP metrics, a configuration for the device to receive communications from the controller via a direct communication link with the controller or via the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
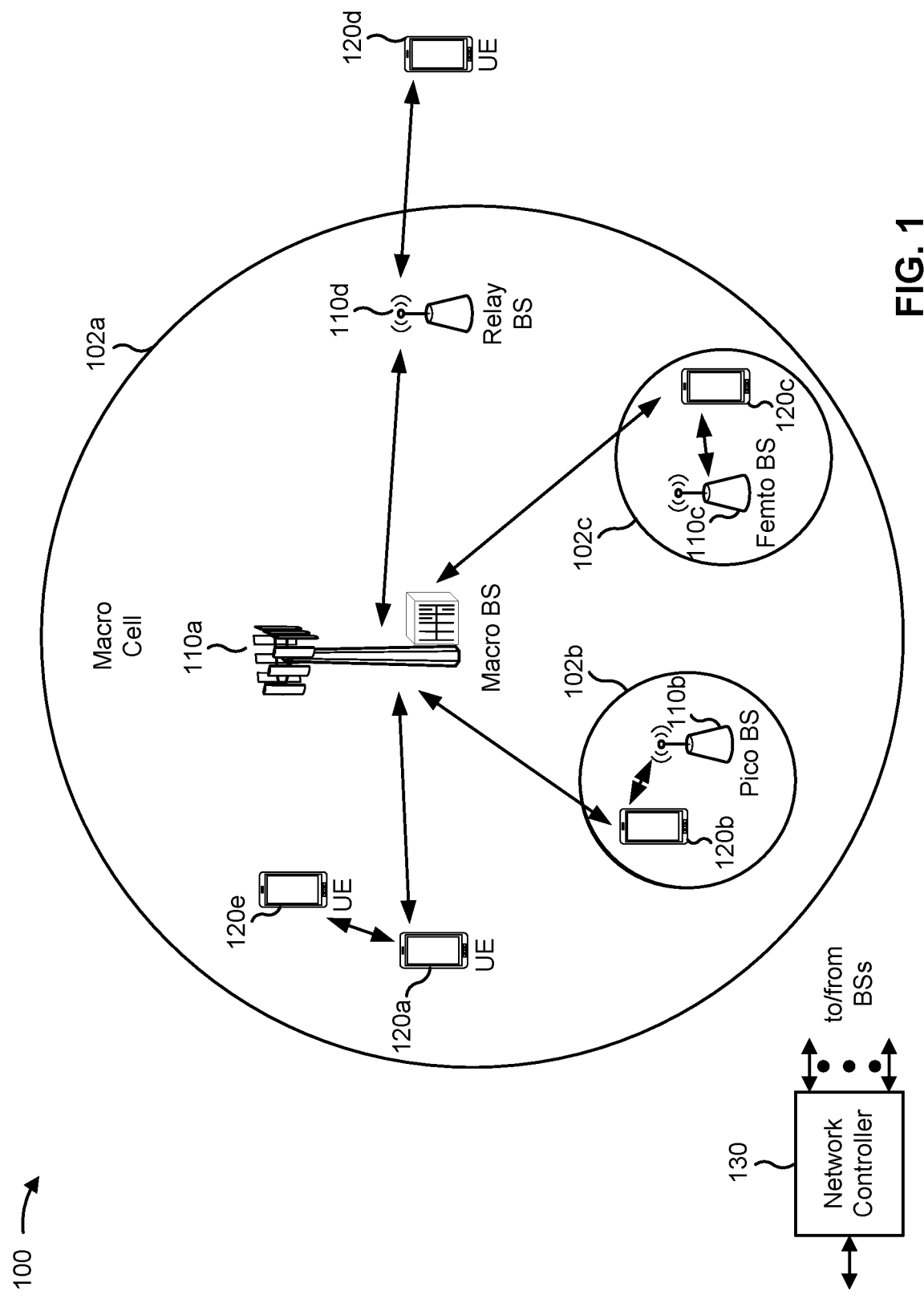
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
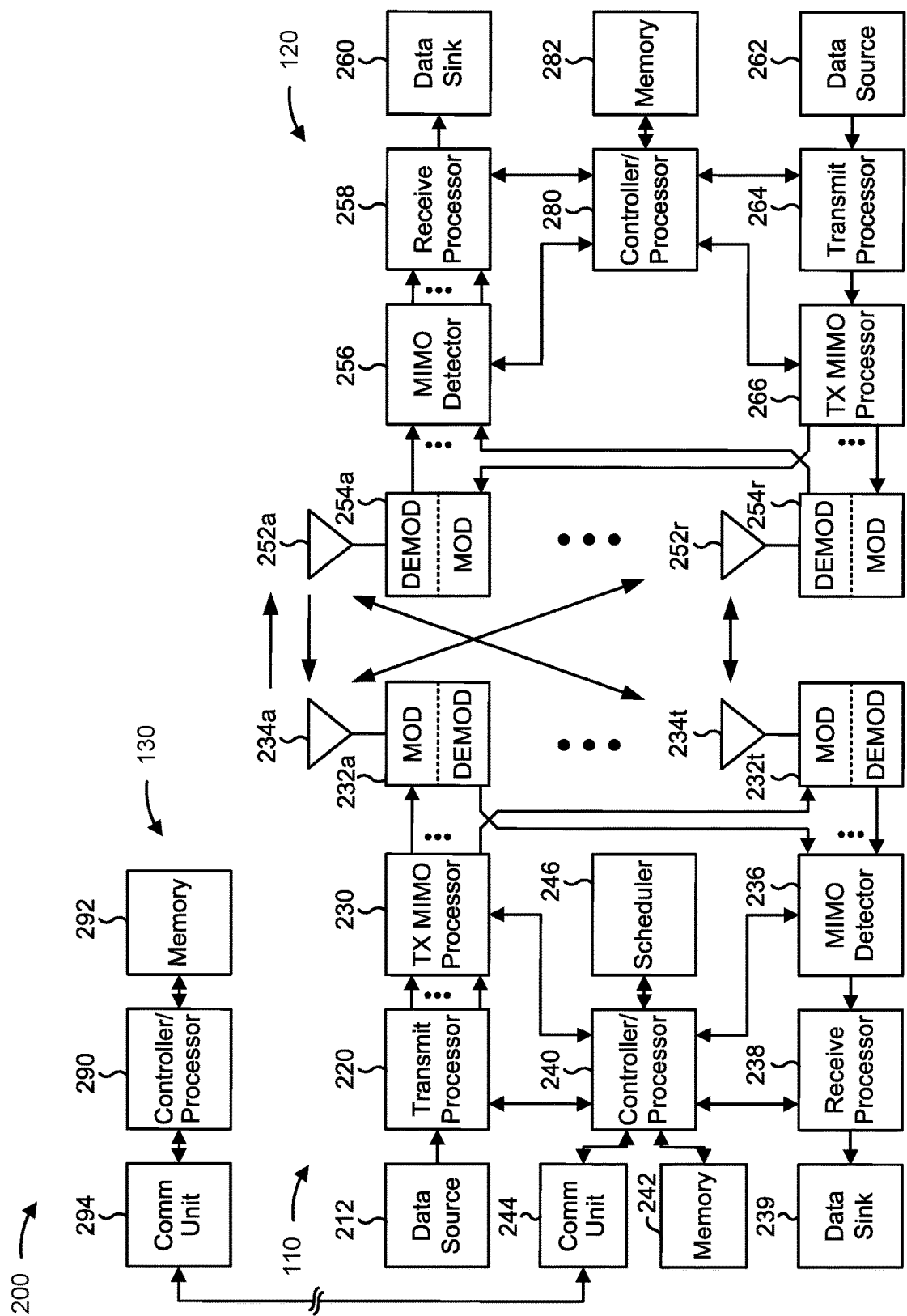
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining a link association for a device, in accordance with various aspects of the present disclosure, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 (e.g., a device) may include means for measuring a set of RSRP metrics for reference signals including one or more reference signals from a base station and one or more reference signals from a controller associated with the device; means for determining, based at least in part on the RSRP metrics, a configuration for receiving communications from the controller via a direct communication link with the controller or via the base station; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 (e.g., a controller) may include means for receiving, from a device, a set of RSRP metrics for reference signals including one or more reference signals associated with a base station and one or more reference signals associated with the controller; means for determining, based at least in part on the RSRP metrics, a configuration for the device to receive communications from the controller via a direct communication link with the controller or via the base station; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 (e.g., a controller) may include means for receiving, from a device, a set of RSRP metrics for reference signals including one or more reference signals associated with a base station and one or more reference signals associated with the controller; means for determining, based at least in part on the RSRP metrics, a configuration for the device to receive communications from the controller via a direct communication link with the controller or via the base station; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving, from a device, a set of RSRP metrics for reference signals including one or more reference signals associated with a base station and one or more reference signals associated with a controller associated with the device; means for determining, based at least in part on the RSRP metrics, a configuration for the device to receive communications from the controller via a direct communication link with the controller or via the base station; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
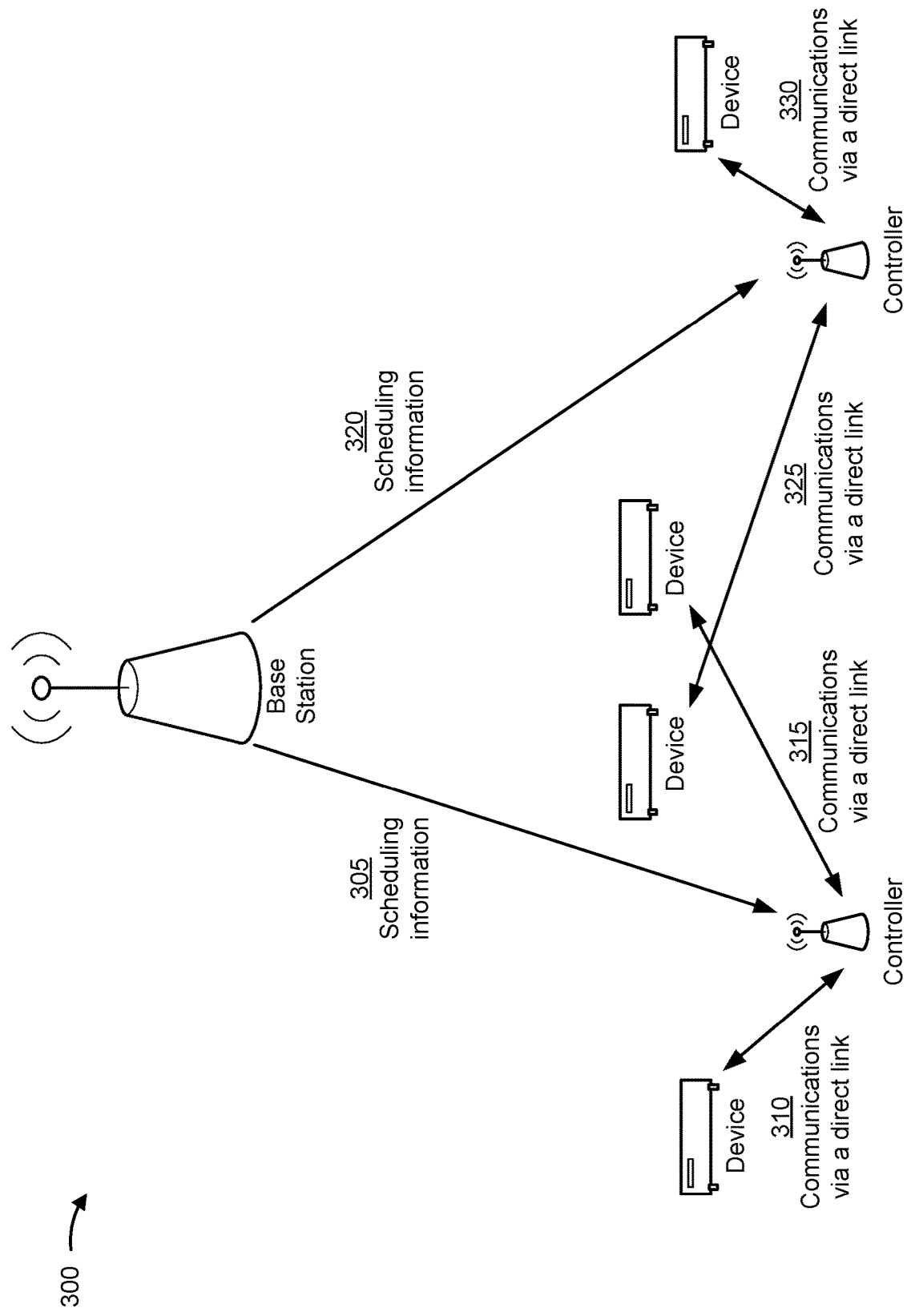
FIG. 3 is a diagram illustrating an example of a link association for a device, in accordance with various aspects of the present disclosure.

FIG. 3 is a diagram illustrating an example 300 of a link association for a device, in accordance with various aspects of the present disclosure. As shown, a base station, one or more controllers, and one or more devices may communicate via a wireless network. The one or more controllers may generate data to control operations of the device. In some aspects, the wireless network may include an industrial IoT wireless network.

In some wireless networks (e.g., in an industrial IoT wireless network), communications from a controller to an associated device (e.g., a sensor, an actuator, and/or the like) may have latency requirements, reliability requirements, and/or the like. For example, the communications may have latency requirements of about 1 to 2 milliseconds and reliability requirements of lower than $10^{-5}$ to $10^{-6}$ error rates. Control channels and data channels may be required to satisfy the latency and/or reliability requirements. To satisfy the latency and/or reliability requirements, the controller may be configured to use semi-persistent scheduling (SPS) resources for first transmissions and to use a physical downlink control channel or physical sidelink control channel message to schedule additional resources for retransmissions.

As shown in FIG. 3, and by reference number 305, the base station may transmit scheduling information to a controller. The scheduling information may include resource allocations for each communication between the controller and associated devices. Alternatively, the scheduling information may include a resource allocation that the controller may use to allocate resources for individual communications between the controller and the associated devices. As shown by reference numbers 310 and 315, the controller may communicate with the associated devices using direct communication links.

As shown by reference number 320, the base station may transmit scheduling information to another controller. The scheduling information may include resource allocations for communications between the other controller and associated devices. The resource allocations for the other controller may be based at least in part on other network traffic (e.g., communications involving other controllers, other devices, and/or the like). As shown by reference numbers 325 and 330, the other controller may communicate with the associated devices using direct communication links.

Based at least in part on using direct communication links, the wireless network may satisfy the latency requirements and may maintain a relatively low load for the network. However, if a quality of the direct communication links is poor, the direct communication links may fail the reliability requirements.

As indicated above, FIG. 3 is provided as an example. Other examples may differ from what is described with respect to FIG. 3.

Figure 4:
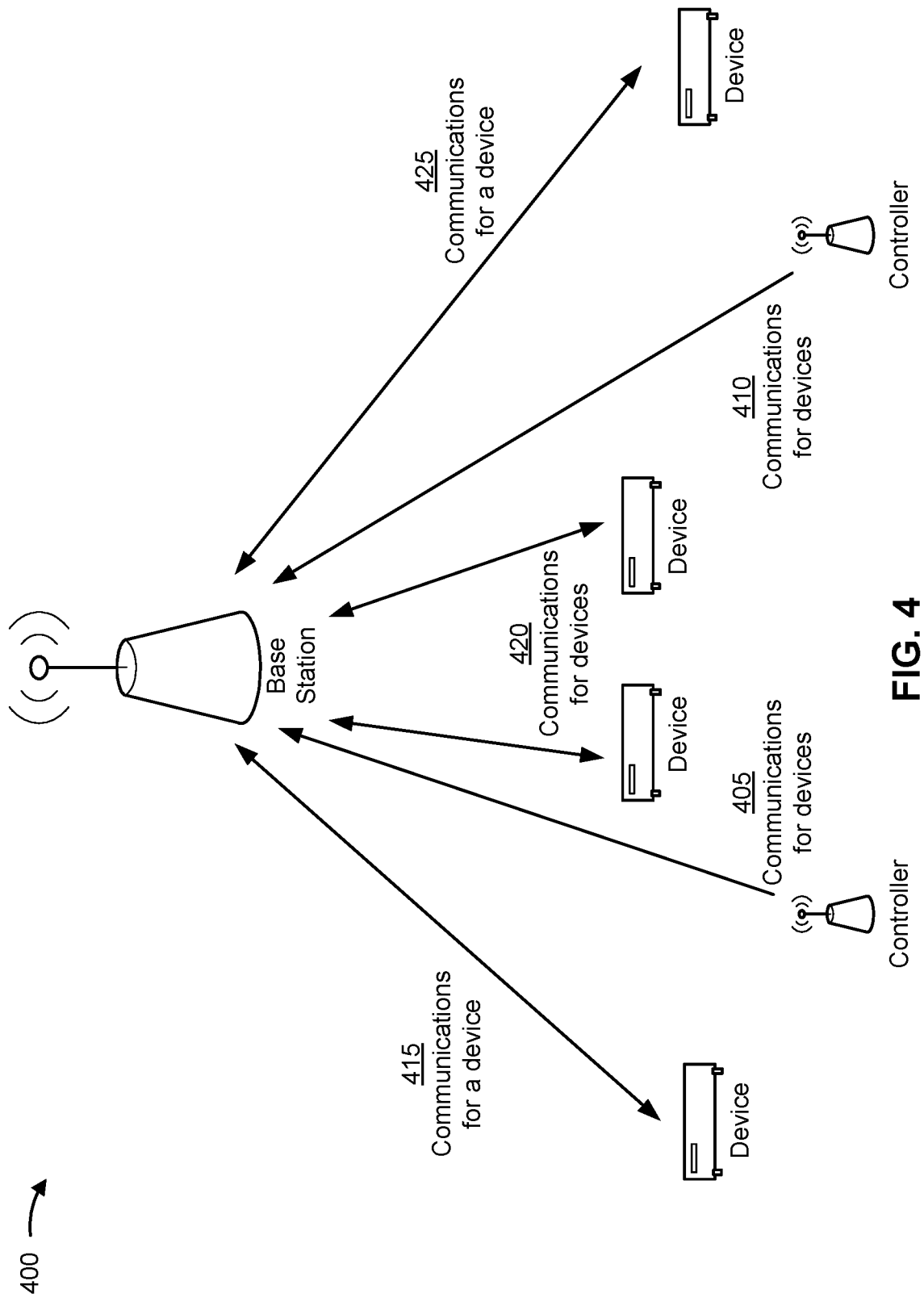
FIG. 4 is a diagram illustrating an example of a link association for a device, in accordance with various aspects of the present disclosure.

FIG. 4 is a diagram illustrating an example 400 of a link association for a device, in accordance with various aspects of the present disclosure. As shown, a base station, one or more controllers, and one or more devices may communicate via a wireless network. The one or more controllers may generate data to control operations of the device. In some aspects, the wireless network may include an industrial IoT wireless network.

As shown in FIG. 4, and by reference numbers 405 and 410, a first controller and a second controller may transmit communications for devices to the base station. As shown by reference numbers 415, 420, and 425, the base station may transmit the communications for the devices. This configuration may be referenced as a 2-hop configuration.

Based at least in part on using a 2-hop configuration, a reliability of the communications for the devices may satisfy the reliability requirements. For example, the base station may be positioned at a location to provide a relatively good coverage area. In some aspects, the base station may be positioned near a ceiling of a room and the one or more controllers may be positioned near a floor of a room (e.g., with an increased likelihood of having obstructions (permanent or temporary) between the controller and associated devices). Additionally, or alternatively, the base station may be configured with components that are configured to provide a relatively good coverage area (e.g., relative to components of the controller).

However, based at least in part on using a 2-hop configuration, computing, communication, and network resources may be unnecessarily used to provide communications to devices that may otherwise have been provided using a direct communication link between the controller and the device. Additionally, or alternatively, the base station may become overloaded (e.g., causing the base station to drop data packets), transmissions to the base station may interfere with each other, and/or the base station may have scheduling constraints that may cause delays that may fail to satisfy the latency requirement.

As indicated above, FIG. 4 is provided as an example. Other examples may differ from what is described with respect to FIG. 4.

Figure 5:
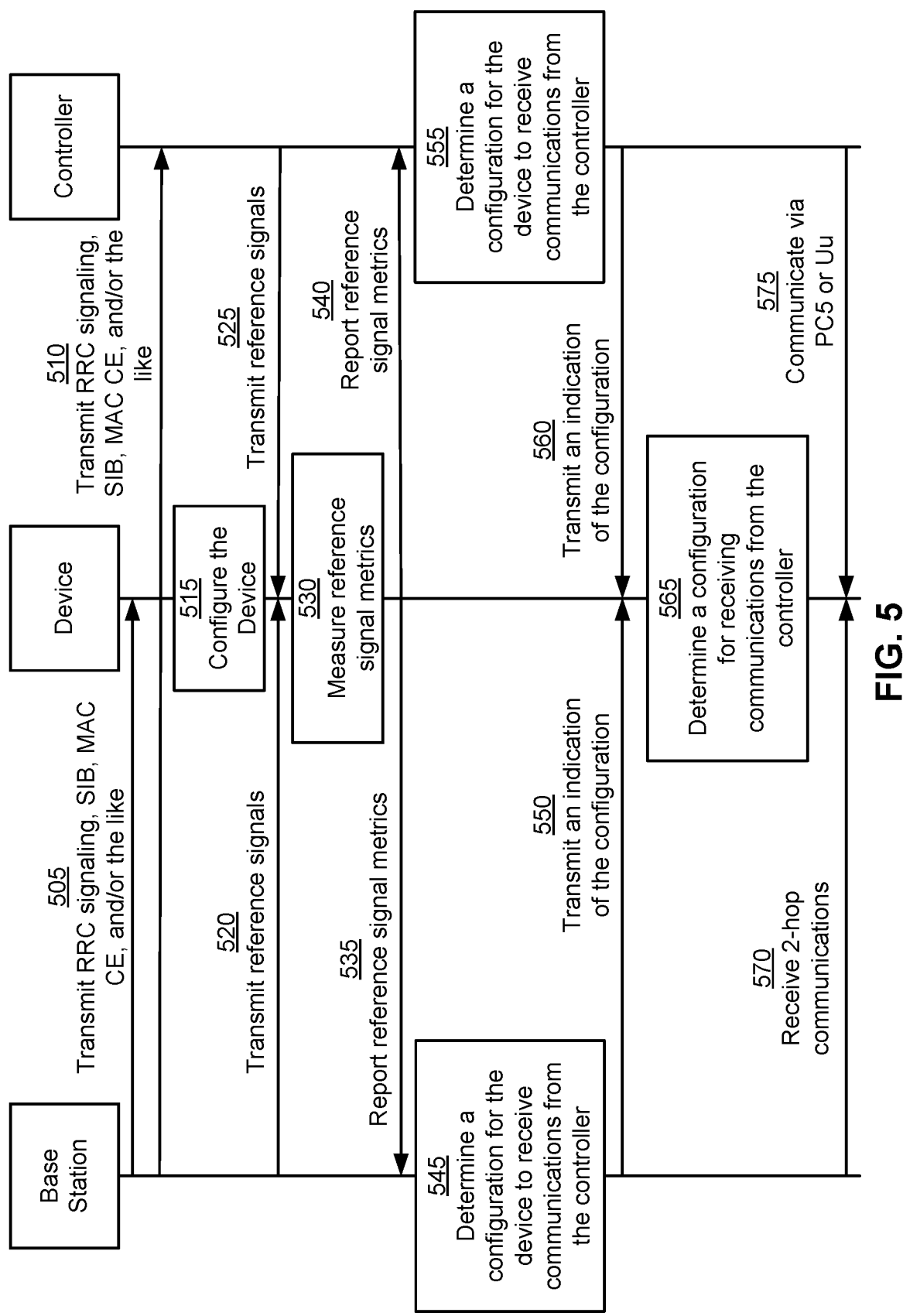
FIG. 5 is a diagram illustrating an example of determining a link association for a device, in accordance with various aspects of the present disclosure.

FIG. 5 is a diagram illustrating an example 500 of determining a link association for a device, in accordance with various aspects of the present disclosure. As shown, a base station (e.g., base station 110), a controller (e.g., base station 110 or UE 120), and a device (e.g., UE 120) may communicate via a wireless network (e.g., wireless network 100). The controller may generate data to control operations of the device. In some aspects, the wireless network may include an industrial IoT wireless network.

In some aspects, the device may be a sensor and/or an actuator. In some aspects, the controller may be a programmable logic controller (PLC). The controller may be configured to operate as a UE, a base station, a pico base station, a femto base station, and/or the like. In some aspects, the device and the controller may be associated based at least in part on an application-based association. In other words, the device and the controller may be associated based at least in part on more than a link-quality indicator (e.g., an RSRP metric, a signal to interference plus noise ratio (SINR) metric, a number of allocated resource blocks, and/or the like). In some aspects, the device and the controller may be associated independently from a link-quality indicator.

As shown by reference number 505, the base station may transmit radio resource control (RRC) signaling, system information blocks (SIBs), medium access control control elements (MAC CEs), and/or the like to the device. In some aspects, the RRC signaling, SIBs, MAC CEs, and/or the like may include information for determining a configuration for the device to receive communications from the controller. For example, the configuration may indicate to receive communications from the controller via a direct communication link with the controller or via the base station.

In some aspects, the configuration may include a configuration for a bias in determining the configuration for receiving communications from the controller via the direct communication link with the controller or via the base station. For example, the bias may be based at least in part on a first resource requirement to receive communications from the controller via the direct communication link with the controller and a second resource requirement to receive communications from the controller via the base station. In other words, the bias may be based at least in part on a first load on the network if the device is configured to receive communications from the controller via the direct communication link and a second load on the network if the device is configured to receive communications from the controller via the base station.

Additionally, or alternatively, the bias may indicate a preference for 1-hop communications, a preference for 2-hop communications, a preference for sidelink communications, a preference for Uu communications, a preference for receiving communications from the controller, a preference for receiving communications from the base station, and/or the like.

The bias may indicate an amount, a proportion, and/or the like that must be overcome by a difference between a link quality indicator for a link between the device and the controller, and a link quality indicator for a link between the device and the base station. For example, the bias may indicate a 20% bias in favor of a link between the device and the controller. The bias may indicate to select a link between the device and the controller unless a link quality indicator (e.g., an RSRP, an SINR, a number of allocated resource blocks, and/or the like) for a link between the device and the base station is 20% better (e.g., higher, greater, and/or the like) than the link between the device and the controller.

As shown by reference number 510, the base station may transmit RRC signaling, SIBs, MAC CEs, and/or the like to the controller. In some aspects, the base station may transmit the RRC signaling, SIBs, MAC CEs, and/or the like to the controller based at least in part on the controller being configured to determine the configuration for the device to receive communication for the controller. In some aspects, the base station may transmit the RRC signaling, SIBs, MAC CEs, and/or the like to the controller instead of, or in addition to, transmitting the RRC signaling, SIBs, MAC CEs, and/or the like to the device. As discussed herein, the RRC signaling, SIBs, MAC CEs, and/or the like may include a configuration for a bias. In some aspects, the configuration for the bias may indicate a process for determining the bias or an explicit indication of the bias.

As shown by reference number 515, the device may configure the device (e.g., based at least in part on the RRC signaling, SIBs, MAC CEs, and/or the like). In some aspects, the controller may additionally, or alternatively, configure the controller based at least in part on the RRC signaling, SIBs, MAC CEs, and/or the like.

As shown by reference number 520, the base station may transmit one or more reference signals (e.g., channel state information reference signals (CSI-RSs)) to the device. As shown by reference number 525, the controller may transmit one or more reference signals (e.g., CSI-RSs) to the device. As shown by reference number 530, the device may measure one or more reference signal metrics based at least in part on the one or more reference signals from the base station and the one or more reference signals from the controller. In some aspects, the device may determine one or more link-quality indicators for each of the link between the device and the controller and the link between the device and the base station.

As shown by reference number 535, the device may report the reference signal metrics to the base station. In other words, the base station may receive a set of reference signal metrics (e.g., RSRP metrics) for reference signals including one or more reference signals associated with the base station and one or more reference signals associated with the controller that is associated with the device. In some aspects, the base station may receive the set of reference signal metrics via the controller.

As shown by reference number 540, the device may report the reference signal metrics to the controller. In other words, the controller may receive the set of reference signal metrics (e.g., RSRP metrics) for reference signals including one or more reference signals associated with a base station and one or more reference signals associated with the controller. In some aspects, the device may report the reference signal metrics to the controller and the controller may report the reference signal metrics to the base station.

As shown by reference number 545, the base station may determine the configuration for the device to receive communications from the controller via the direct communication link with the controller or via the base station. In some aspects, the base station may determine the configuration based at least in part on a link quality indicator (e.g., RSRP metric) associated with the controller and a link quality indicator associated with the base station. In some aspects, the base station may determine the configuration based at least in part on the bias (e.g., in addition to the link quality indicators).

In some aspects, the configuration may indicate that the device is to receive communications from the controller via a direct communication link with the controller. In some aspects, the configuration may indicate that the device is to receive communications from the controller via the base station. In some aspects, the configuration may indicate that the device is to receive transmissions of communications via a direct link with the controller and to receive re-transmissions of communications via the base station.

As shown by reference number 550, the base station may transmit an indication to select the controller or the base station for receiving communications. In some aspects, the base station may transmit the indication to the device. In some aspects, the base station may transmit the indication to the controller. In some aspects, the base station may transmit the indication to the device via the controller.

As shown by reference number 555, the controller may determine the configuration for the device to receive communications from the controller via the direct communication link with the controller or via the base station. In some aspects, the controller may make the determination based at least in part on an indication from the base station. In some aspects, the controller may make the determination without, or independently from, an indication from the base station.

In some aspects, the controller may determine the configuration based at least in part on the link quality indicator (e.g., RSRP metric) associated with the controller and the link quality indicator associated with the base station. In some aspects, the base station may determine the configuration based at least in part on the bias (e.g., in addition to the link quality indicators).

As shown by reference number 560, the controller may transmit an indication of the configuration to the device. In some aspects, the controller may transmit the indication based at least in part on receiving the indication from the base station. In some aspects, the controller may transmit the indication based at least in part on making the determination without, or independently from, an indication from the base station.

As shown by reference number 565, the device may determine the configuration for receiving communications from the controller (e.g., via a direct communication link with the controller or via the base station). In some aspects, the device may determine the configuration based at least in part on an indication from the base station and/or the controller. In some aspects, the device may make the determination without, or independently from, an indication from the base station or the controller.

In some aspects (e.g., when the device is in idle mode), the device may determine the configuration based at least in part on a link quality indicator associated with the controller and a link quality indicator associated with the base station. In some aspects, the base station may determine the configuration based at least in part on the bias (e.g., in addition to the link quality indicators).

As shown by reference number 570, the device may receive 2-hop communications via the base station. In some aspects, the device may receive all communications (e.g., during a period of time) via the base station. In some aspects, the device may receive retransmissions of communications via the base station.

As shown by reference number 575, the device may communicate with the controller using a PC5 interface or a Uu interface. For example, the device may communicate with the controller via one or more sidelink channels using a PC5 interface. Alternatively, the device may communicate with the controller via a Uu interface based at least in part on control information from the controller (e.g., with the controller scheduling communications between the controller and the device).

Based at least in part on the device determining the configuration based at least in part on a bias, the network may provide parameters in addition to link-quality indicators to determine the configuration. This may avoid unnecessarily using computing, network, and/or communication resources for the communications between the controller and the device. Additionally or alternatively, the configuration may be biased to reduce certain configurations that are discouraged from being used (e.g., based at least in part on consuming network resources) unless the bias is overcome (e.g., to satisfy the latency requirements and/or the reliability requirements of the communications).

As indicated above, FIG. 5 is provided as an example. Other examples may differ from what is described with respect to FIG. 5.

Figure 6:
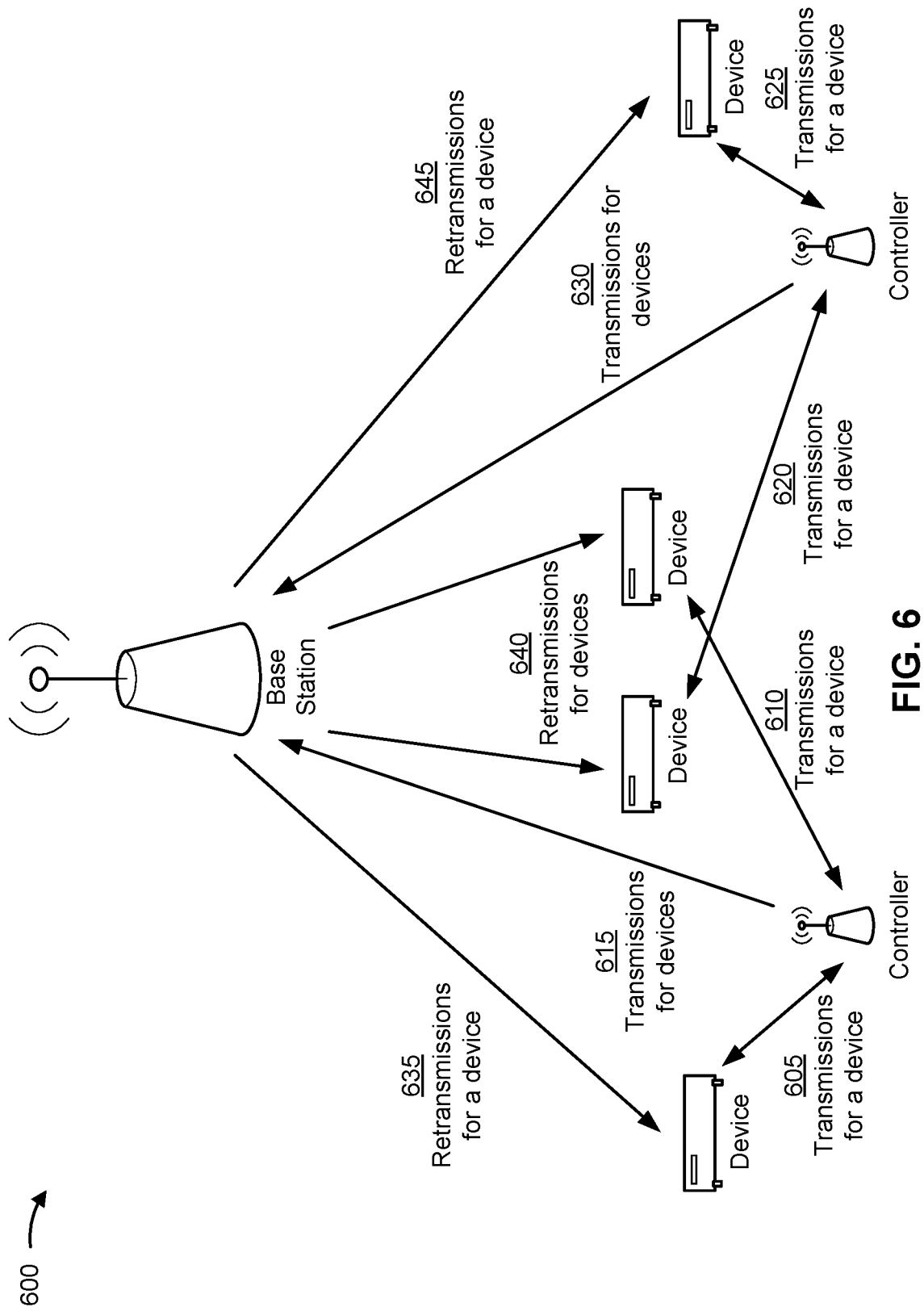
FIG. 6 is a diagram illustrating an example of a link association for a device, in accordance with various aspects of the present disclosure.

FIG. 6 is a diagram illustrating an example 600 of a link association for a device, in accordance with various aspects of the present disclosure. As shown, a base station (e.g., base station 110), one or more controllers (e.g., base station 110 or UE 120), and one or more devices (e.g., UE 120) may communicate via a wireless network (e.g., wireless network 100). The one or more controllers may generate data to control operations of the device. In some aspects, the wireless network may include an industrial IoT wireless network.

As shown in FIG. 6, and by reference numbers 605 and 610, a controller may attempt to transmit communications to associated devices. For example, the controller may transmit original transmissions to the devices. The controller may receive an acknowledgement or a negative acknowledgement, or may fail to receive feedback, associated with the transmitted communications. The controller may determine that a retransmission is needed based at least in part on receiving a negative acknowledgement or failing to receive feedback. If the controller determines that a retransmission is needed, the controller may determine whether the retransmission is needed based at least in part on blocking (e.g., by an obstruction), interference, and/or the like.

As shown by reference number 615, the base station may also receive the transmitted communications intended for the associated devices. The base station may receive the transmissions from the controller so the base station is able to retransmit the transmissions, if needed.

As shown by reference numbers 635, 640, and 645, the base station may retransmit, to the devices, the transmitted communications. The base station may retransmit the transmitted communications based at least in part on receiving indications from the controller, the devices, and/or the like that indicate that the base station is to retransmit the transmitted communications.

This configuration, where the base station may be used to retransmit communications from controllers to devices, may improve reliability of the communications. For example, the base station may provide spatial diversity that may avoid obstructions that block transmissions from the one or more controllers to associated devices. In some aspects, this configuration may be selected for one or more devices. In some aspects, this configuration may be selected based at least in part on one or more link quality indicators, a bias, and/or the like. In some aspects, the base station, a controller, a device, and/or the like may select this configuration for one or more of the devices.

As indicated above, FIG. 6 is provided as an example. Other examples may differ from what is described with respect to FIG. 6.

Figure 7:
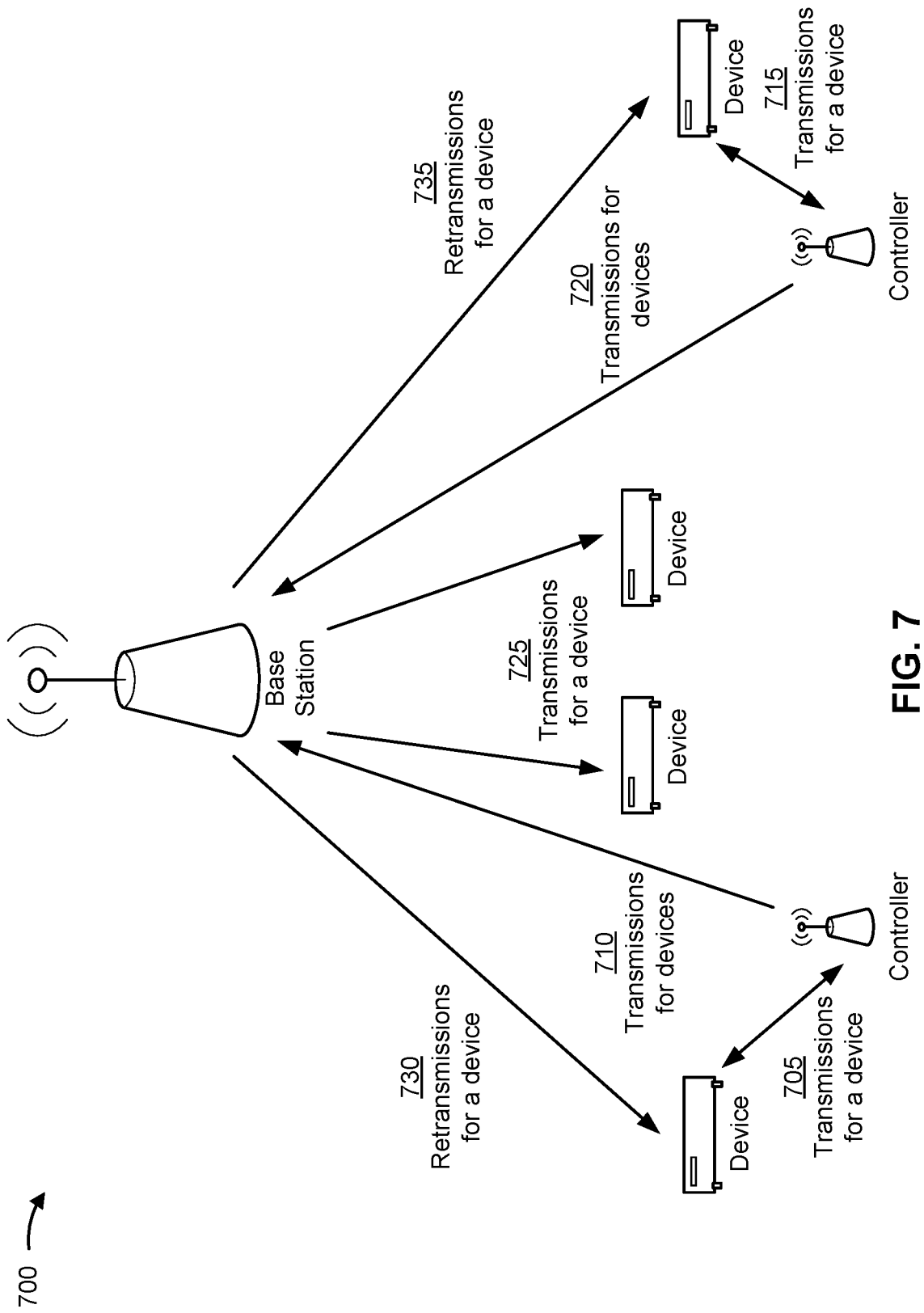
FIG. 7 is a diagram illustrating an example of a link association for a device, in accordance with various aspects of the present disclosure.

FIG. 7 is a diagram illustrating an example 700 of a link association for a device, in accordance with various aspects of the present disclosure. As shown, a base station (e.g., base station 110), one or more controllers (e.g., base station 110 or UE 120), and one or more devices (e.g., UE 120) may communicate via a wireless network (e.g., wireless network 100). The one or more controllers may generate data to control operations of the device. In some aspects, the wireless network may include an industrial IoT wireless network.

As shown by reference number 705, a controller may transmit communications to a device using a direct communication link. As shown by reference number 710, the controller may transmit communications to the base station.

As shown by reference number 715, another controller may transmit communications to a device using a direct communication link. As shown by reference number 720, the other controller may transmit communications to the base station.

As shown by reference number 725, the base station may transmit communications to one or more devices. In some aspects, the communication may be original transmissions that the controller and the other controller have not first attempted to transmit to the one or more devices. In some aspects, the one or more devices may be configured to receive the communication as 2-hop communications, as selected according to one or more techniques described herein.

As shown by reference numbers 730, and 735, the base station may retransmit communications to additional devices. In some aspects, the additional devices may be configured to receive original transmissions via associated controllers and to receive retransmission via the base station, as selected according to one or more techniques described herein.

In this way, only some of the devices may use 2-hop communications, some of the devices may use direct communication links with the controllers, and some may use both (e.g., the direct communication links for original transmissions and 2-hop communications for retransmissions).

As indicated above, FIG. 7 is provided as an example. Other examples may differ from what is described with respect to FIG. 7.

Figure 8:
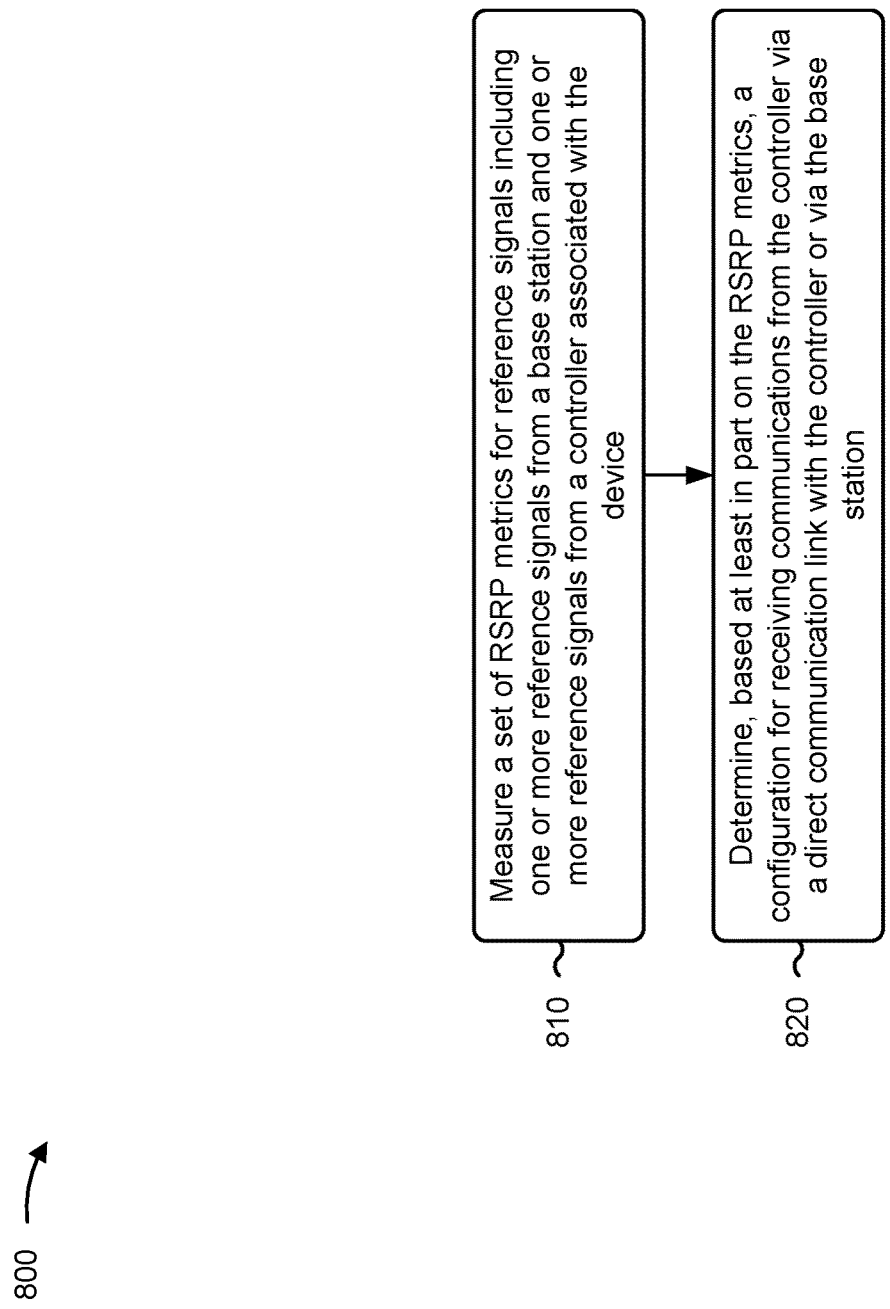
FIG. 8 is a diagram illustrating an example process performed, for example, by a device, in accordance with various aspects of the present disclosure.

FIG. 8 is a diagram illustrating an example process 800 performed, for example, by a device, in accordance with various aspects of the present disclosure. Example process 800 is an example where the device (e.g., UE 120 and/or the like) performs operations associated with determining a link association for a device.

As shown in FIG. 8, in some aspects, process 800 may include measuring a set of RSRP metrics for reference signals including one or more reference signals from a base station and one or more reference signals from a controller associated with the device (block 810). For example, the device (e.g., using antenna 252, DEMOD 254, MIMO detector 256, receive processor 258, controller/processor 280, and/or the like) may measure a set of RSRP metrics for reference signals including one or more reference signals from a base station and one or more reference signals from a controller associated with the device, as described above.

As further shown in FIG. 8, in some aspects, process 800 may include determining, based at least in part on the RSRP metrics, a configuration for receiving communications from the controller via a direct communication link with the controller or via the base station (block 820). For example, the device (e.g., using controller/processor 280 and/or the like) may determine, based at least in part on the RSRP metrics, a configuration for receiving communications from the controller via a direct communication link with the controller or via the base station, as described above.

Process 800 may include additional aspects, such as any single aspect or any combination of aspects described below and/or in connection with one or more other processes described elsewhere herein.

In a first aspect, the device is associated with the controller via an application-based association.

In a second aspect, alone or in combination with the first aspect, determining the configuration for receiving communications from the controller via the direct communication link with the controller or via the base station includes determining to receive communications via the direct communication link with the controller based at least in part on an RSRP metric associated with the controller being greater than an RSRP metric associated with the base station.

In a third aspect, alone or in combination with one or more of the first and second aspects, process 800 includes receiving a configuration for a bias in determining the configuration for receiving communications from the controller via the direct communication link with the controller or via the base station, and determining the configuration for receiving communications from the controller via the direct communication link with the controller or via the base station based at least in part on the bias.

In a fourth aspect, alone or in combination with one or more of the first through third aspects, process 800 includes receiving an indication of the bias via one or more of: an SIB, RRC signaling, or a MAC CE.

In a fifth aspect, alone or in combination with one or more of the first through fourth aspects, the bias is based at least in part on one or more of: a first resource requirement to receive communications from the controller via the direct communication link with the controller and a second resource requirement to receive communications from the controller via the base station, a preference for 1-hop communications, a preference for 2-hop communications, a preference for sidelink communications, a preference for Uu communications, a preference for receiving communications from the controller, or a preference for receiving communications from the base station.

In a sixth aspect, alone or in combination with one or more of the first through fifth aspects, process 800 includes determining the configuration for receiving communications from the controller via a direct communication link with the controller, wherein the configuration indicates to receive transmissions of communications via a direct link with the controller and to receive retransmissions of communications via the base station.

In a seventh aspect, alone or in combination with one or more of the first through sixth aspects, process 800 includes determining the configuration for receiving communications from the controller via a direct communication link with the controller, wherein the configuration indicates to receive transmissions of communications via a direct link with the controller using a PC5 interface or a Uu interface.

In an eighth aspect, alone or in combination with one or more of the first through seventh aspects, process 800 includes reporting the set of RSRP metrics to the controller or the base station.

In a ninth aspect, alone or in combination with one or more of the first through eighth aspects, determining the configuration for receiving communications from the controller via the direct communication link with the controller or via the base station includes receiving, from the base station, an indication to select the controller or the base station for receiving communications from the controller, or receiving, from the controller, an indication to select the controller or the base station for receiving communications from the controller.

In a tenth aspect, alone or in combination with one or more of the first through ninth aspects, the device is a sensor or an actuator.

In an eleventh aspect, alone or in combination with one or more of the first through tenth aspects, the controller is a PCL.

In a twelfth aspect, alone or in combination with one or more of the first through eleventh aspects, determining the configuration is further based at least in part on one or more of an SINR metric or a number of allocated resource blocks for a link between the device and the controller, or an SINR metric or a number of allocated resource blocks for a link between the device and the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
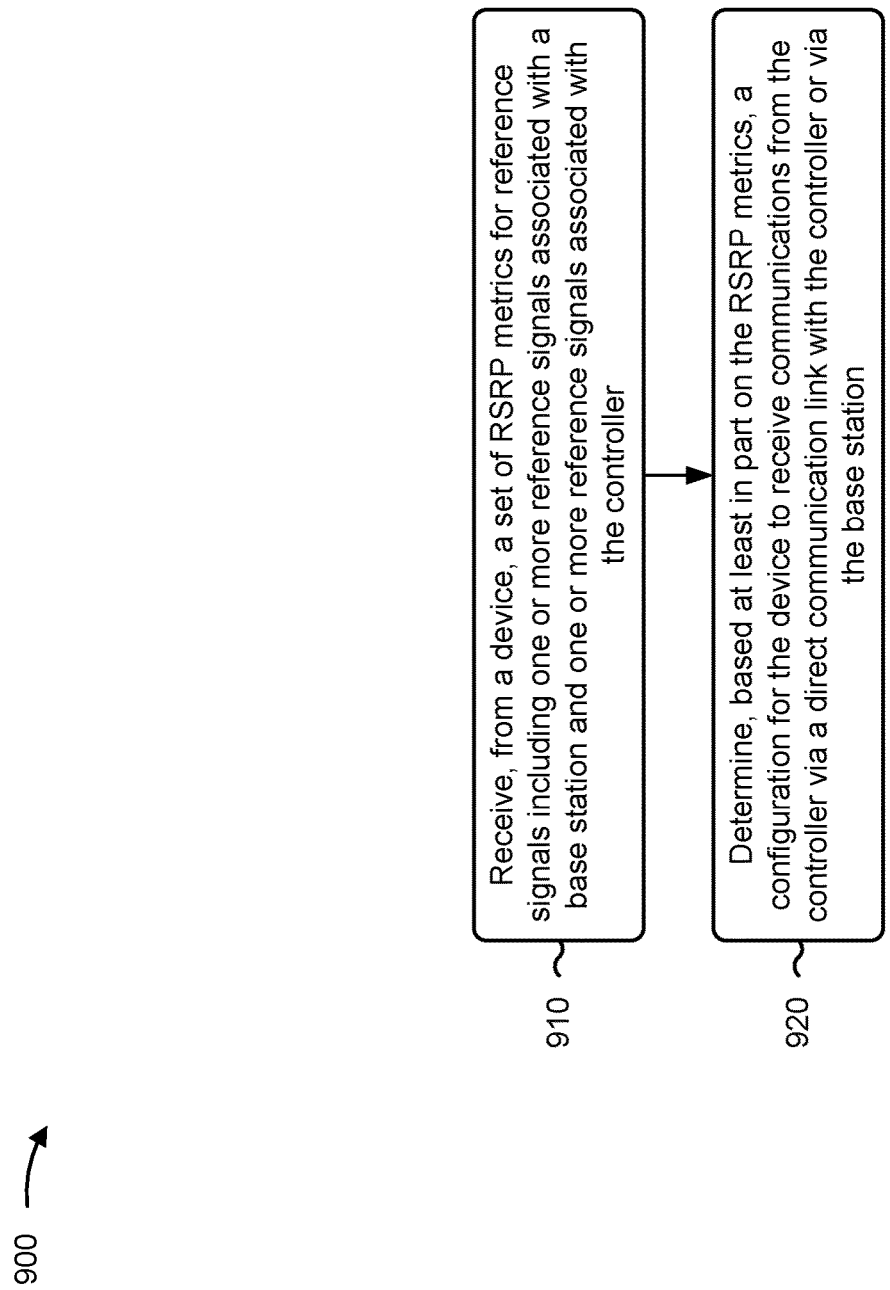
FIG. 9 is a diagram illustrating an example process performed, for example, by a controller, in accordance with various aspects of the present disclosure.

FIG. 9 is a diagram illustrating an example process 900 performed, for example, by a controller, in accordance with various aspects of the present disclosure. Example process 900 is an example where the controller (e.g., UE 120 or base station 110 and/or the like) performs operations associated with determining a link association for a device.

As shown in FIG. 9, in some aspects, process 900 may include receiving, from a device, a set of RSRP metrics for reference signals including one or more reference signals associated with a base station and one or more reference signals associated with the controller (block 910). For example, the controller (e.g., using antenna 252, DEMOD 254, MIMO detector 256, receive processor 258, controller/processor 280, antenna 234, DEMOD 232, MIMO detector 236, receive processor 238, controller/processor 240, and/or the like) may receive, from a device, a set of RSRP metrics for reference signals including one or more reference signals associated with a base station and one or more reference signals associated with the controller, as described above.

As further shown in FIG. 9, in some aspects, process 900 may include determining, based at least in part on the RSRP metrics, a configuration for the device to receive communications from the controller via a direct communication link with the controller or via the base station (block 920). For example, the controller (e.g., using controller/processor 280, controller/processor 240, and/or the like) may determine, based at least in part on the RSRP metrics, a configuration for the device to receive communications from the controller via a direct communication link with the controller or via the base station, as described above.

Process 900 may include additional aspects, such as any single aspect or any combination of aspects described below and/or in connection with one or more other processes described elsewhere herein.

In a first aspect, the controller is associated with the device via an application-based association.

In a second aspect, alone or in combination with the first aspect, determining the configuration for the device to receive communications from the controller via the direct communication link with the controller or via the base station includes determining that the device is to receive communications via the direct communication link with the controller based at least in part on an RSRP metric associated with the controller being greater than an RSRP metric associated with the base station.

In a third aspect, alone or in combination with one or more of the first and second aspects, process 900 includes receiving a configuration for a bias in determining the configuration for the device to receive communications from the controller via the direct communication link with the controller or via the base station, and determining the configuration for the device to receive communications from the controller via the direct communication link with the controller or via the base station based at least in part on the bias.

In a fourth aspect, alone or in combination with one or more of the first through third aspects, process 900 includes receiving an indication of the bias via one or more of an SIB, RRC signaling, or a MAC CE.

In a fifth aspect, alone or in combination with one or more of the first through fourth aspects, the bias is based at least in part on one or more of a first resource requirement for the device to receive communications from the controller via the direct communication link with the controller and a second resource requirement for the device to receive communications from the controller via the base station, a preference for 1-hop communications, a preference for 2-hop communications, a preference for sidelink communications, a preference for Uu communications, a preference for the device to receive communications from the controller, or a preference for the device to receive communications from the base station.

In a sixth aspect, alone or in combination with one or more of the first through fifth aspects, process 900 includes determining the configuration for the device to receive communications from the controller via a direct communication link with the controller, wherein the configuration indicates that the device is to receive transmissions of communications via a direct link with the controller and to receive re-transmissions of communications via the base station.

In a seventh aspect, alone or in combination with one or more of the first through sixth aspects, process 900 includes determining the configuration for the device to receive communications from the controller via a direct communication link with the controller, wherein the configuration indicates to receive transmissions of communications via a direct link with the controller using a PC5 interface or a Uu interface.

In an eighth aspect, alone or in combination with one or more of the first through seventh aspects, process 900 includes reporting the set of RSRP metrics to the base station.

In a ninth aspect, alone or in combination with one or more of the first through eighth aspects, determining the configuration for the device to receive communications from the controller via the direct communication link with the controller or via the base station includes receiving, from the base station, an indication to select the controller or the base station for the device to receive communications from the controller.

In a tenth aspect, alone or in combination with one or more of the first through ninth aspects, the device is a sensor or an actuator.

In an eleventh aspect, alone or in combination with one or more of the first through tenth aspects, the controller is a PCL.

In a twelfth aspect, alone or in combination with one or more of the first through eleventh aspects, determining the configuration is further based at least in part on one or more of an SINR metric or a number of allocated resource blocks for a link between the device and the controller, or an SINR metric or a number of allocated resource blocks for a link between the device and the base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
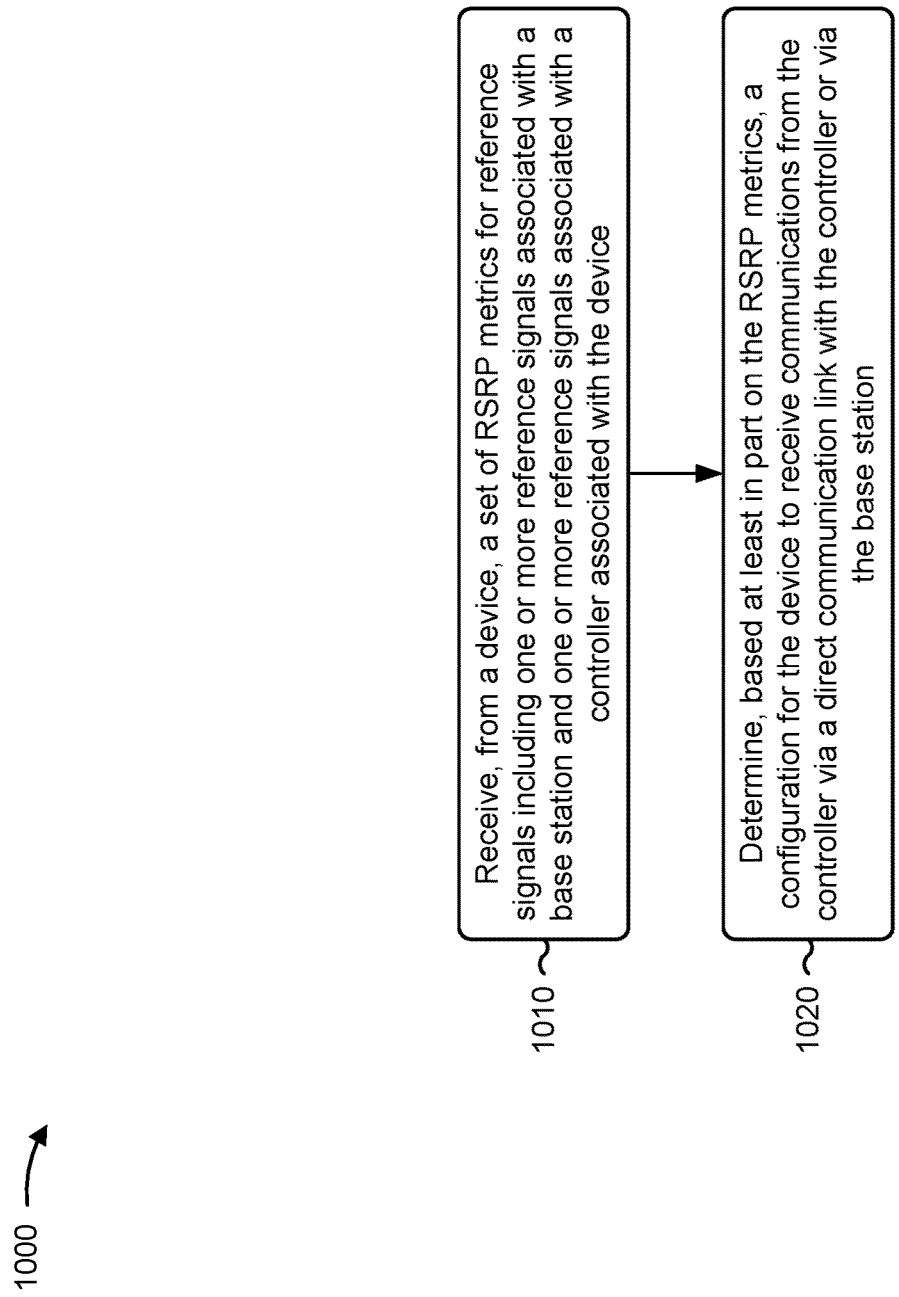
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with determining a link association for a device.

As shown in FIG. 10, in some aspects, process 1000 may include receiving, from a device, a set of RSRP metrics for reference signals including one or more reference signals associated with the base station and one or more reference signals associated with a controller associated with the device (block 1010). For example, the base station (e.g., using receive processor 238, controller/processor 240, memory 242, and/or the like) may receive, from a device, a set of RSRP metrics for reference signals including one or more reference signals associated with the base station and one or more reference signals associated with a controller associated with the device, as described above.

As further shown in FIG. 10, in some aspects, process 1000 may include determining, based at least in part on the RSRP metrics, a configuration for the device to receive communications from the controller via a direct communication link with the controller or via the base station (block 1020). For example, the base station (e.g., using controller/processor 240, memory 242, and/or the like) may determine, based at least in part on the RSRP metrics, a configuration for the device to receive communications from the controller via a direct communication link with the controller or via the base station, as described above.

Process 1000 may include additional aspects, such as any single aspect or any combination of aspects described below and/or in connection with one or more other processes described elsewhere herein.

In a first aspect, the controller is associated with the device via an application-based association.

In a second aspect, alone or in combination with the first aspect, determining the configuration for the device to receive communications from the controller via the direct communication link with the controller or via the base station includes determining that the device is to receive communications via the direct communication link with the controller based at least in part on an RSRP metric associated with the controller being greater than an RSRP metric associated with the base station.

In a third aspect, alone or in combination with one or more of the first and second aspects, process 1000 includes determining the configuration for the device to receive communications from the controller via the direct communication link with the controller or via the base station based at least in part on a bias.

In a fourth aspect, alone or in combination with one or more of the first through third aspects, the bias is based at least in part on one or more of a first resource requirement for the device to receive communications from the controller via the direct communication link with the controller and a second resource requirement for the device to receive communications from the controller via the base station, a preference for 1-hop communications, a preference for 2-hop communications, a preference for sidelink communications, a preference for Uu communications, a preference for the device to receive communications from the controller, or a preference for the device to receive communications from the base station.

In a fifth aspect, alone or in combination with one or more of the first through fourth aspects, process 1000 includes determining the configuration for the device to receive communications from the controller via a direct communication link with the controller, wherein the configuration indicates that the device is to receive transmissions of communications via a direct link with the controller and to receive re-transmissions of communications via the base station.

In a sixth aspect, alone or in combination with one or more of the first through fifth aspects, process 1000 includes determining the configuration for the device to receive communications from the controller via a direct communication link with the controller, wherein the configuration indicates to receive transmissions of communications via a direct link with the controller using a PC5 interface or a Uu interface.

In a seventh aspect, alone or in combination with one or more of the first through sixth aspects, process 1000 includes receiving the set of RSRP metrics via the controller.

In an eighth aspect, alone or in combination with one or more of the first through seventh aspects, the device is a sensor or an actuator.

In a ninth aspect, alone or in combination with one or more of the first through eighth aspects, the controller is a PCL.

In a tenth aspect, alone or in combination with one or more of the first through ninth aspects, determining the configuration is further based at least in part on one or more of an SINR metric or a number of allocated resource blocks for a link between the device and the controller, or an SINR metric or a number of allocated resource blocks for a link between the device and the base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a device, comprising:
    measuring a set of reference signal receive power (RSRP) metrics for reference signals including one or more reference signals from a base station and one or more reference signals from a controller associated with the device; and
    determining, based at least in part on the RSRP metrics, a configuration for receiving communications from the controller,
        wherein the configuration indicates to receive transmissions of the communications via a direct link with the controller and to receive retransmissions of the communications via the base station.

2. The method of claim 1, further comprising:
    receiving an indication of a bias,
        wherein the indication of the bias is received via one or more of:
            a system information block,
            radio resource control signaling, or
            a medium access control control element,
        wherein the configuration is determined further based the bias, and
        wherein the bias is based at least in part on one or more of:
            a preference for 1-hop communications,
            a preference for 2-hop communications,
            a preference for sidelink communications,
            a preference for Uu communications,
            a preference for receiving from the controller, or
            a preference for receiving from the base station.

3. The method of claim 1, wherein the configuration further indicates to receive the transmissions of the communications via the direct link with the controller using a PC5 interface or a Uu interface.

4. The method of claim 1, wherein the device is a sensor or an actuator.

5. The method of claim 1, wherein the configuration is determined further based at least in part on one or more of:
    a signal to interference plus noise ratio (SINR) metric or a number of allocated resource blocks for the direct link with the controller, or
    an SINR metric or a number of allocated resource blocks for a link between the device and the base station.

6. A method of wireless communication performed by a controller, comprising:
    receiving, from a device, a set of reference signal receive power (RSRP) metrics for reference signals including one or more reference signals associated with a base station and one or more reference signals associated with the controller; and determining, based at least in part on the RSRP metrics,
a configuration for the device to receive communications from the controller,
wherein the configuration indicates that the device is to receive transmissions of the communications via a direct link with the controller and to receive retransmissions of the communications via the base station.

7. The method of claim 6, further comprising:
receiving an indication of a bias,
wherein the indication of the bias is received via one or more of:
a system information block,
radio resource control signaling, or
a medium access control control element,
wherein the configuration is determined further based the bias, and
wherein the bias is based at least in part on one or more of:
a preference for 1-hop communications,
a preference for 2-hop communications,
a preference for sidelink communications,
a preference for Uu communications,
a preference for the device to receive from the controller, or
a preference for the device to receive from the base station.

8. The method of claim 7, wherein the indication of the bias is received via one or more of:
a system information block,
radio resource control signaling, or
a medium access control control element.

9. The method of claim 6,
wherein the configuration further indicates for the device to receive the transmissions of the communications via the direct link with the controller using a PC5 interface or a Uu interface.

10. The method of claim 6, wherein the controller is a programmable logic controller.

11. The method of claim 6, wherein the configuration is determined further based at least in part on one or more of:
a signal to interference plus noise ratio (SINR) metric or a number of allocated resource blocks for the direct link with the controller, or
an SINR metric or a number of allocated resource blocks for a link between the device and the base station.

12. A method of wireless communication performed by a base station, comprising:
receiving, from a device, a set of reference signal receive power (RSRP) metrics for reference signals including one or more reference signals associated with the base station and one or more reference signals associated with a controller associated with the device; and
determining, based at least in part on the RSRP metrics,
a configuration for the device to receive communications from the controller,
wherein the configuration indicates to receive transmissions of the communications via a direct link with the controller and to receive retransmissions of the communications via the base station.

13. The method of claim 12,
wherein the configuration is determined further based on a bias, and
wherein the bias is based at least in part on one or more of:
a preference for 1-hop communications,
a preference for 2-hop communications,
a preference for sidelink communications,
a preference for Uu communications,
a preference for receiving from the controller, or
a preference for receiving from the base station.

14. The method of claim 12, wherein the configuration further indicates to receive the transmissions of the communications via the direct link with the controller using a PC5 interface or a Uu interface.

15. The method of claim 12, wherein the set of RSRP metrics are received via the controller.

16. The method of claim 12, wherein the configuration is determined further based at least in part on one or more of:
a signal to interference plus noise ratio (SINR) metric or a number of allocated resource blocks for the direct link with the controller, or
an SINR metric or a number of allocated resource blocks for a link between the device and the base station.

17. A device for wireless communication, comprising:
a memory; and
one or more processors configured to:
measure a set of reference signal receive power (RSRP) metrics for reference signals including one or more reference signals from a base station and one or more reference signals from a controller associated with the device; and
determine, based at least in part on the RSRP metrics,
a configuration for receiving communications from the controller,
wherein the configuration indicates to receive transmissions of the communications via a direct link with the controller and to receive retransmissions of the communications via the base station.

18. The device of claim 17, wherein the one or more processors are further configured to:
receive an indication of a bias,
wherein the indication of the bias is received via one or more of:
a system information block,
radio resource control signaling, or
a medium access control control element,
wherein the configuration is determined further based the bias, and
wherein the bias is based at least in part on one or more of:
a preference for 1-hop communications,
a preference for 2-hop communications,
a preference for sidelink communications,
a preference for Uu communications,
a preference for receiving from the controller, or
a preference for receiving from the base station.

19. The device of claim 17, wherein the configuration further indicates to receive the transmissions of the communications via the direct link with the controller using a PC5 interface or a Uu interface.

20. The device of claim 17, wherein the device is a sensor or an actuator.

21. The device of claim 17, wherein the configuration is determined further based at least in part on one or more of:
a signal to interference plus noise ratio (SINR) metric or a number of allocated resource blocks for the direct link with the controller, or
an SINR metric or a number of allocated resource blocks for a link between the device and the base station.

22. A controller for wireless communication, comprising:
a memory; and
one or more processors configured to:
receive, from a device, a set of reference signal receive power (RSRP) metrics for reference signals including one or more reference signals associated with a base station and one or more reference signals associated with the controller; and determine, based at least in part on the RSRP metrics, a configuration for the device to receive communications from the controller, wherein the configuration indicates that the device is to receive transmissions of the communications via a direct link with the controller and to receive retransmissions of the communications via the base station.

23. The controller of claim 22, wherein the one or more processors are further configured to:

receive an indication of a bias, wherein the indication of the bias is received via one or more of:

a system information block, radio resource control signaling, or a medium access control control element, wherein the configuration is determined further based the bias, and wherein the bias is based at least in part on one or more of:

a preference for 1-hop communications, a preference for 2-hop communications, a preference for sidelink communications, a preference for Uu communications, a preference for the device to receive from the controller, or a preference for the device to receive from the base station.

24. The controller of claim 22, wherein the configuration further indicates for the device to receive the transmissions of the communications via the direct link with the controller using a PC5 interface or a Uu interface.

25. The controller of claim 22, wherein the controller is a programmable logic controller.

26. The controller of claim 22, wherein the configuration is determined further based at least in part on one or more of:

a signal to interference plus noise ratio (SINR) metric or a number of allocated resource blocks for the direct link with the controller, or an SINR metric or a number of allocated resource blocks for a link between the device and the base station.

27. A base station, comprising:

a memory; and one or more processors configured to:

receive, from a device, a set of reference signal receive power (RSRP) metrics for reference signals including one or more reference signals associated with the base station and one or more reference signals associated with a controller associated with the device; and determine, based at least in part on the RSRP metrics, a configuration for the device to receive communications from the controller, wherein the configuration indicates to receive transmissions of the communications via a direct link with the controller and to receive retransmissions of the communications via the base station.

28. The base station of claim 27, wherein the configuration is determined further based on a bias, and wherein the bias is based at least in part on one or more of:

a preference for 1-hop communications, a preference for 2-hop communications, a preference for sidelink communications, a preference for Uu communications, a preference for receiving from the controller, or a preference for receiving from the base station.

29. The base station of claim 27, wherein the configuration further indicates to receive the transmissions of the communications via the direct link with the controller using a PC5 interface or a Uu interface.

30. The base station of claim 27, wherein the set of RSRP metrics are received via the controller.

31. The base station of claim 27, wherein the configuration is determined further based at least in part on one or more of:

a signal to interference plus noise ratio (SINR) metric or a number of allocated resource blocks for the direct link with the controller, or an SINR metric or a number of allocated resource blocks for a link between the device and the base station.

* * * * *